Jan. 26, 1960     C. W. PATTERSON     2,922,234

EDUCATIONAL AID FOR TEACHING READING

Filed March 25, 1958

Charles W. Patterson
INVENTOR.

United States Patent Office 2,922,234
Patented Jan. 26, 1960

2,922,234

EDUCATIONAL AID FOR TEACHING READING

Charles W. Patterson, Clifton Heights, Pa.

Application March 25, 1958, Serial No. 723,798

1 Claim. (Cl. 35—73)

The present invention generally relates to an educational aid and more particularly to a device for assisting in teaching reading and in building the vocabulary of those using the device and otherwise enabling teachers to impart more effectively to the students certain basic principles which will enable the students to develop more readily competency of a language.

The primary object of the present invention is to provide a device in which the use of the touch sense is employed in combination with the usual auditory visual perception in learning to read and to write.

The present invention incorporates a construction in the form of a board having longitudinally arranged pairs of grooves thereon for slidably receiving a multiplicity of cards having letters or other indicia formed thereon and defined by a series of apertures with the underlying surface of the board being colored for emphasizing the characteristics of the letter appearing on the card.

Another object of the present invention is to provide an educational aid which is extremely simple in construction, easy to use, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
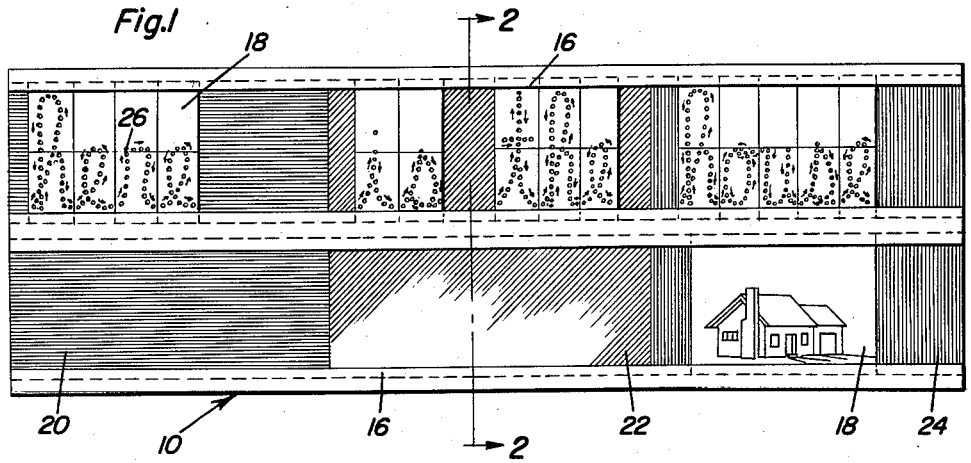
Figure 1 is a plan view of the educational aid of the present invention illustrating the board and the cards mounted thereon.
Figure 2:
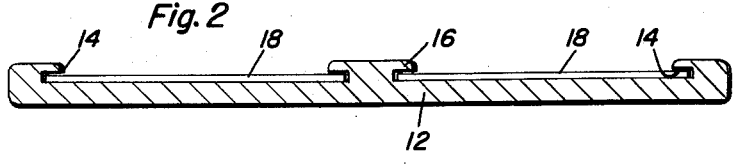
Figure 2 is a sectional view taken substantially upon a plane passing along section line 2—2 of Figure 1 illustrating the construction of the board and the grooves for receiving the edges thereof.
Figure 3:
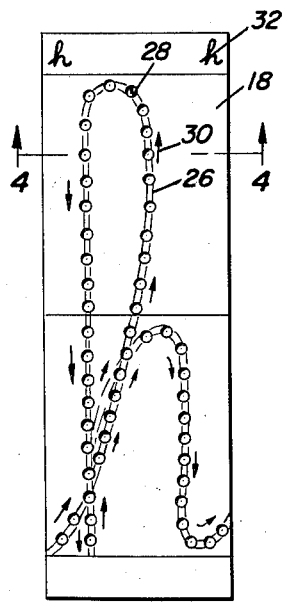
Figure 3 is an enlarged plan view of one of the cards illustrating the letter defined thereon.
Figure 4:
Figure 4 is a sectional view taken substantially upon a plane passing along section line 4—4 of Figure 3 illustrating the apertures passing through the cards.

Referring now specifically to the drawings, the numeral 10 generally designates the board which constitutes a part of the present invention and includes an elongated flat member 12 which may be constructed of wood, plastic or the like and which includes two pair of opposed grooves 14 which are defined by projecting flanges 16. The flanges 16 overlie the top and bottom edges respectively of a series of generally rectangular cards 18. The ends of the grooves 14 are open thus permitting the cards 18 to be moved longitudinally out of the grooves 14 permitting interchanging of the cards 18.

The surface of the elongated member 12 which is observed between the flanges 16 is colored three distinguishable colors with one third of the area being colored black as designated by the numeral 20, one third of the area being colored red as indicated by the numeral 22 and the other third of the area being colored green as indicated by the numeral 24. The particular colorings may be altered or varied as desired as long as the areas are distinguishable from each other and are readily perceptible.

Each of the cards 18 is of rectangular configuration and is provided with a letter or other indicia disposed thereon and designated by the numeral 26 with the indicia 26 being defined by a series of spaced apertures 28 extending through the cards 18. The arrangement of the apertures 28 is such that it defines the outline of the indicia 26 with the area between the apertures 28 being distinguishably colored for illustrating the complete shape of the indicia 26. Also directional arrows 30 are disposed alongside of the indicia 26 indicating the manner in which the letter is formed when writing whereby a person may trace his finger from the point of origin to the point of completion of the letter by following the arrows thus providing a touch sense for defining the shape of the letter. Each upper corner of the card 18 is provided with a small letter or indicia 32 for indicating what is formed on the card as the indicia 26.

Figure 5:
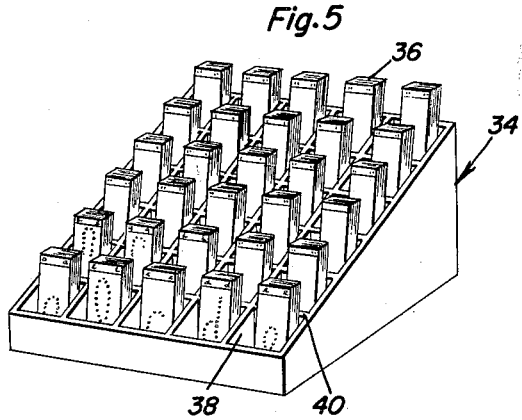
Figure 5 is a perspective view of a holder or rack for the multiplicity of cards for holding the cards for ready accessibility so that the same may be easily and expeditiously changed.

Figure 5 illustrates a rack or container generally designated by the numeral 34 for a multiplicity of sets of cards 36 which are arranged in a plurality of rows with the rows being spaced from each other by longitudinal dividers 38 and with the sets of cards in each row being separated by transverse dividers 40. The sets of cards 36 are arranged in stair step fashion, that is the rearmost steps are arranged above the forwardmost sets thus revealing the small indicia of the two for retaining the cards in a readily accessible position wherein the cards may be readily obtained from the rack and inserted into the grooves 14.

One typical arrangement is shown in Figure 1 and in which the letters are arranged to set forth a sentence "Here is the house." Also a card having a picture of a house thereon may be inserted immediately under the group of cards which spells the word "house." The coloring behind the letters formed by the apertures 28 will emphasize the arrangement of the perforations in the cards and more clearly bring out the shape of the letter. This device utilizes the inherent colors which are permanent upon the retinal or visual memory of the individual who is attempting to learn the language. The letters are exaggerated shapes of the ups and downs of the manuscript printing or cursive writing which in itself is an aid to building language facility. With the present device, the student will grasp the concept of phonetic elements of each word by bringing together three individual capabilities simultaneously, namely, visual imagery, auditory perception and kinesthetic or touch and the student will indirectly derive meaning and understanding of the language from the context of the sentences used.

The tiered box or rack shown in Figure 5 enables the various cards to be readily located and employed thereby facilitating the use of the device.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

An educational device comprising the combination of an elongated board having a longitudinal recess in the upper surface thereof with the edges of the recess having longitudinal grooves forming longitudinal guides, a plurality of cards slidably mounted between said guides in overlying relation to the upper surface of the board between the grooves, the upper surface of the board between the groove being divided into equal length areas having distinguishable colors, each of said cards having indicia thereon with the outline of the indicia being defined by a series of spaced apertures whereby the spaced apertures will reveal the distinguishable color behind the card for emphasizing the shape of the indicia on the card.

References Cited in the file of this patent

UNITED STATES PATENTS

| | | |
|---|---|---|
| 626,423 | Hargens | June 6, 1899 |
| 1,061,913 | Hughes | May 13, 1913 |
| 1,103,369 | Montessori | July 14, 1914 |
| 1,428,456 | Stranders | Sept. 5, 1922 |
| 1,479,523 | Barton | Jan. 1, 1924 |
| 2,482,658 | Culp | Sept. 20, 1949 |

FOREIGN PATENTS

| | | |
|---|---|---|
| 705,108 | France | Mar. 3, 1931 |
| 789,526 | France | Aug. 19, 1935 |